(12) United States Patent
Yang

(10) Patent No.: US 9,114,667 B2
(45) Date of Patent: Aug. 25, 2015

(54) TANK WHEEL

(71) Applicant: Chung-Yi Yang, New Taipei (TW)

(72) Inventor: Chung-Yi Yang, New Taipei (TW)

( * ) Notice: Subject to any disclaimer, the term of this patent is extended or adjusted under 35 U.S.C. 154(b) by 45 days.

(21) Appl. No.: 14/164,662

(22) Filed: Jan. 27, 2014

(65) Prior Publication Data
US 2015/0210113 A1   Jul. 30, 2015

(51) Int. Cl.
*B60B 33/00* (2006.01)
*A47B 91/06* (2006.01)

(52) U.S. Cl.
CPC ......... *B60B 33/0044* (2013.01); *B60B 33/0049* (2013.01)

(58) Field of Classification Search
CPC ...... B60B 29/002; B60B 30/10; B60B 33/00; B60B 33/001; B60B 33/0018; B60B 33/0002; B60B 33/0023; B60B 33/0026; B60B 33/04; B60B 33/0042; B60B 33/0044; B62B 230/08; B62B 230/10; B62B 2202/02; B62B 2202/10; B62B 2202/12; B62B 2206/02; B62B 5/0083; B62B 5/0086; B62B 3/02; B62B 1/12; B62B 1/16; B62B 1/264; A47B 91/06; A47B 91/12; A47B 91/16
USPC ...... 16/19, 47, 20, 30, 42 R, 42 T; 248/188.8, 248/346.11, 346.07; 280/129, 188.9, 188.8, 280/188, 188.1, 188.2
See application file for complete search history.

(56) References Cited

U.S. PATENT DOCUMENTS

| | | | | |
|---|---|---|---|---|
| 816,269 | A * | 3/1906 | Stengel | 16/48 |
| 1,114,353 | A * | 10/1914 | Hight et al. | 16/42 R |
| 2,529,390 | A * | 11/1950 | Hauer | 16/29 |
| 2,800,679 | A * | 7/1957 | Schultz, Jr. | 16/29 |
| 3,879,798 | A * | 4/1975 | Krulwich | 16/18 R |
| 4,332,052 | A * | 6/1982 | Remington | 16/30 |
| 4,415,173 | A * | 11/1983 | Tenebruso | 280/47.131 |
| 4,422,212 | A * | 12/1983 | Sheiman et al. | 16/29 |
| 4,589,530 | A * | 5/1986 | Sher | 190/18 A |
| 4,719,663 | A * | 1/1988 | Termini | 16/30 |
| 5,727,284 | A * | 3/1998 | Deutsch | 16/30 |
| 5,737,801 | A * | 4/1998 | Flood | 16/30 |
| 5,740,584 | A * | 4/1998 | Hodge et al. | 16/30 |
| 5,815,885 | A * | 10/1998 | Chen | 16/47 |
| 5,971,408 | A * | 10/1999 | Mandel et al. | 280/43.2 |
| 6,371,497 | B1 * | 4/2002 | Scire | 280/42 |
| 7,036,631 | B2 * | 5/2006 | Feik et al. | 182/129 |
| 7,383,612 | B2 * | 6/2008 | Bushey | 16/29 |
| 7,481,405 | B2 * | 1/2009 | Johnson | 248/188.3 |
| 8,490,331 | B2 * | 7/2013 | Quesada | 49/425 |
| 2003/0038439 | A1 * | 2/2003 | Novak et al. | 280/79.7 |

(Continued)

*Primary Examiner* — Chuck Mah

(74) *Attorney, Agent, or Firm* — Schmeiser, Olsen & Watts, LLP

(57) ABSTRACT

A tank wheel includes a main body, rollers and an object supporting member. The main body includes a containing groove concavely formed at the main body and having an opening facing downward, and a rail installed at the top of the main body. The rollers, parallel to one another, are axially coupled into the containing groove of the main body and slightly protruded out from the opening of the containing groove. The object supporting member includes a rail corresponding seat and an object support platform. The rail corresponding seat is movably installed in the rail of the main body, and the top of the rail corresponding seat has an assembling part, and the bottom of the object support platform has a hemispherical base corresponding to the assembling part, the object support platform can be disposed on the rail corresponding seat, and the object support platform can be tilted.

4 Claims, 7 Drawing Sheets

(56) References Cited

U.S. PATENT DOCUMENTS

| | | | |
|---|---|---|---|
| 2003/0094554 A1* | 5/2003 | Bushey | 248/223.41 |
| 2003/0192145 A1* | 10/2003 | Lai et al. | 16/19 |
| 2007/0220704 A1* | 9/2007 | Willis | 16/47 |
| 2008/0174080 A1* | 7/2008 | Lewis | 280/33.991 |
| 2014/0021691 A1* | 1/2014 | Buttazzoni et al. | 280/79.11 |

* cited by examiner

TANK WHEEL

FIELD OF TECHNOLOGY

The present invention relates to a tank wheel, in particular to the tank wheel capable of sliding and moving an object supporting member and adjusting the inclination of an object support platform, so as to fit the bottom of an object.

BACKGROUND

In general, a conventional tank wheel is installed at the bottom of an object for transporting the object, and a crawler belt is used for driving the tank wheel to move forward.

However, the crawler belt comes with a complicated structure, and thus the crawler belt may be damaged easily by a rough ground surface or places with too many sand and gravel. As a result, the tank wheel cannot be used.

Since the top of the tank wheel has a fixed object support platform to support the object, therefore the object support platform of the tank wheel cannot fit the bottom of various types of objects. If the edge of the bottom of the object is very narrow, the object support platform of the tank wheel may not be able to fit the bottom of the object. More specifically, the center of gravity of the object cannot be situated at a position of the tank wheel, so that the object may be turned over during the transportation, and the safety of users may be jeopardized.

In addition, the object support platform is fixed to the top of the tank wheel, so that when the bottom of the object is a bevel, the object support platform of the tank wheel also does not fit the bottom of the object.

In summation, the conventional tank wheel cannot be applied to various types of objects, and the conventional tank wheel may be damaged easily when it is used on a rough ground.

Therefore, it is a main subject of the present invention to provide a durable tank wheel that fits the bottom of various types of objects.

SUMMARY

Therefore, it is a primary objective of the present invention to provide a novel tank wheel to overcome the problems of the conventional tank wheel, since the crawler belt of the conventional tank wheel may be damaged easily, so that the conventional tank wheel becomes useless, and the object support platform is fixed permanently to the top of the conventional tank wheel, so that the conventional tank wheel cannot fit the bottom of various types of objects.

An objective of the present invention is to provide a durable tank wheel that fits the bottom of various types of objects.

To achieve the aforementioned and other objectives, the present invention provides a tank wheel comprising a main body, a plurality of rollers and an object supporting member.

The main body includes a containing groove concavely formed inside the main body and having an opening facing downward, and a rail installed at the top of the main body.

The rollers are axially and respectively coupled to the plurality of shafts inside the containing groove of the main body, and the rollers are arranged in parallel to one another, and the rollers are slightly protruded out from the opening of the containing groove.

The object supporting member includes a rail corresponding seat movably installed into the rail of the main body, wherein the top of the rail corresponding seat has an assembling part; and an object support platform with a bottom having a hemispherical base corresponding to the assembling part, so that the object support platform can be installed at the rail corresponding seat to tilt the object support platform.

In the tank wheel, the rollers are cylindrical rollers.

In the tank wheel, the object supporting member further comprises a movable fixing member installed at the rail corresponding seat to movably fix the rail corresponding seat to the rail of the main body.

In summation, the aforementioned design of the tank wheel of the present invention allows the tank wheel to be used on various different types of grounds and improves the durability of the tank wheel. In addition, the design of the rail, the rail corresponding seat and the hemispherical base allows the tank wheel to be applied to the bottom of various different types of objects.

BRIEF DESCRIPTION

DETAILED DESCRIPTION

The objects, characteristics and effects of the present invention will become apparent with the detailed description of the preferred embodiments and the illustration of related drawings as follows.

Figure 1:
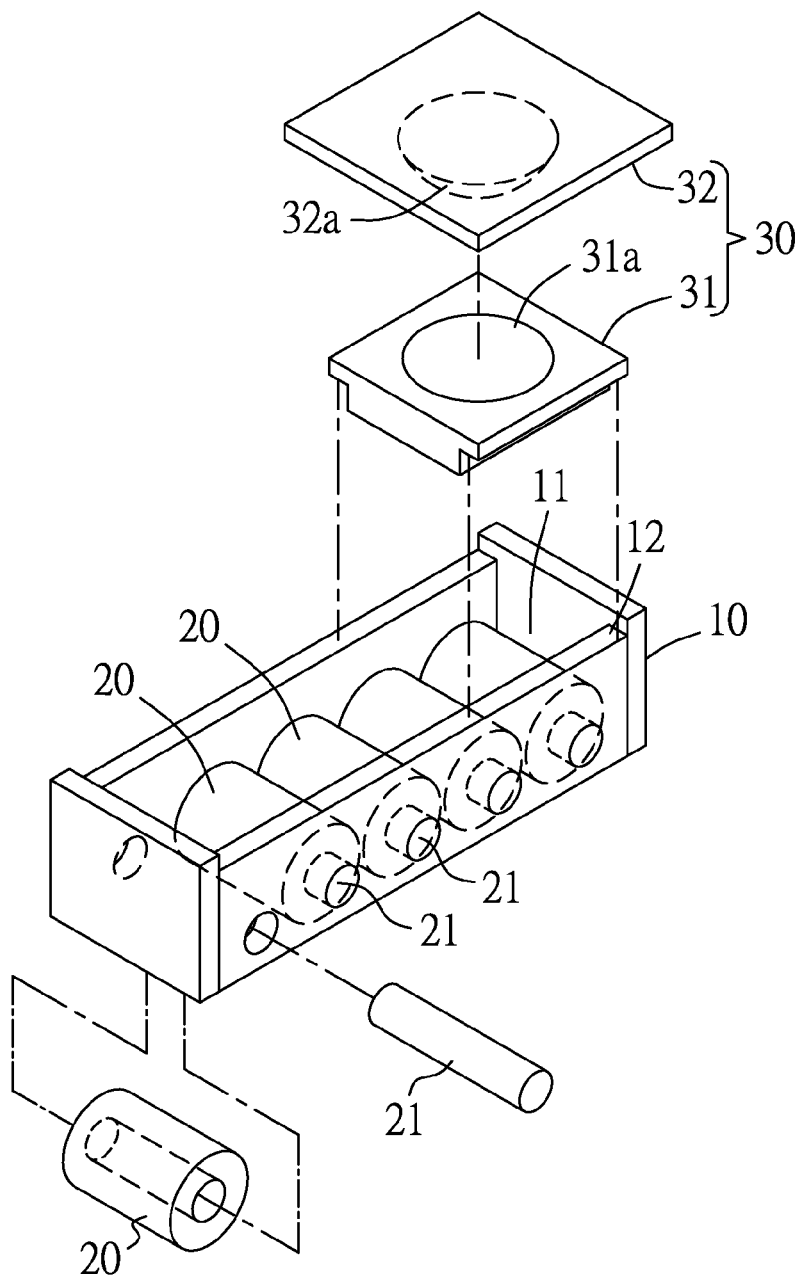
FIG. 1 is a perspective view of a tank wheel in accordance with a first preferred embodiment of the present invention.
Figure 2:
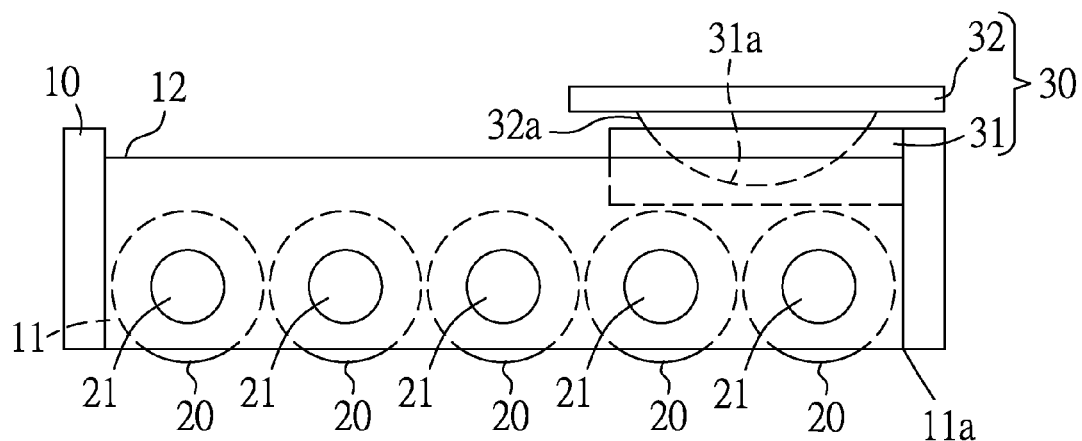
FIG. 2 is a front view of a tank wheel in accordance with the first preferred embodiment of the present invention.
Figure 3:
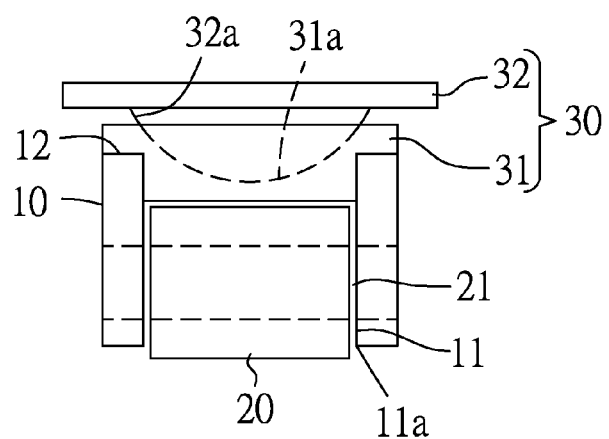
FIG. 3 is a right side view of a tank wheel in accordance with the first preferred embodiment of the present invention.

With reference to FIGS. 1 to 3 for the tank wheel 100 in accordance with the first preferred embodiment of the present invention, the tank wheel 100 comprises a main body 10, a plurality of rollers 20 and an object supporting member 30.

The main body 10 includes a containing groove 11 and a rail 12, wherein the containing groove 11 is concavely formed in the main body 10, and an opening 11a of the containing groove 11 faces downward; and the rail 12 is installed at the top of the main body 10. More specifically, the containing groove 11 is disposed at the bottom of the rail 12.

The rollers 20 are axially and respectively coupled to a plurality of shafts 21 in the containing groove 11 of the main body 10, and the rollers 20 are parallel to one another and slightly protruded out from the opening 11a of the containing groove 11 as shown in FIG. 2 or 3. Wherein, the rollers 20 are preferably cylindrical rollers, and such design can effectively improve the service life of the rollers 20 and prevent pebbles from sticking into the rollers 20.

The object supporting member 30 includes a rail corresponding seat 31 and an object support platform 32, wherein the rail corresponding seat 31 is movably installed in the rail 12 of the main body 10, and the top of the rail corresponding seat 31 has an assembling part 31a, and the design of the rail 12 allows the rail corresponding seat 31 to move horizontally in the rail 12; and the bottom of the object support platform 32 has a hemispherical base 32a corresponding to the assembling part 31a, such that the object support platform 32 can be installed at the rail corresponding seat 31, and the object support platform 32 can be tilted through the corresponding relation of the hemispherical base 32a and the assembling part 31a.

Figure 4:
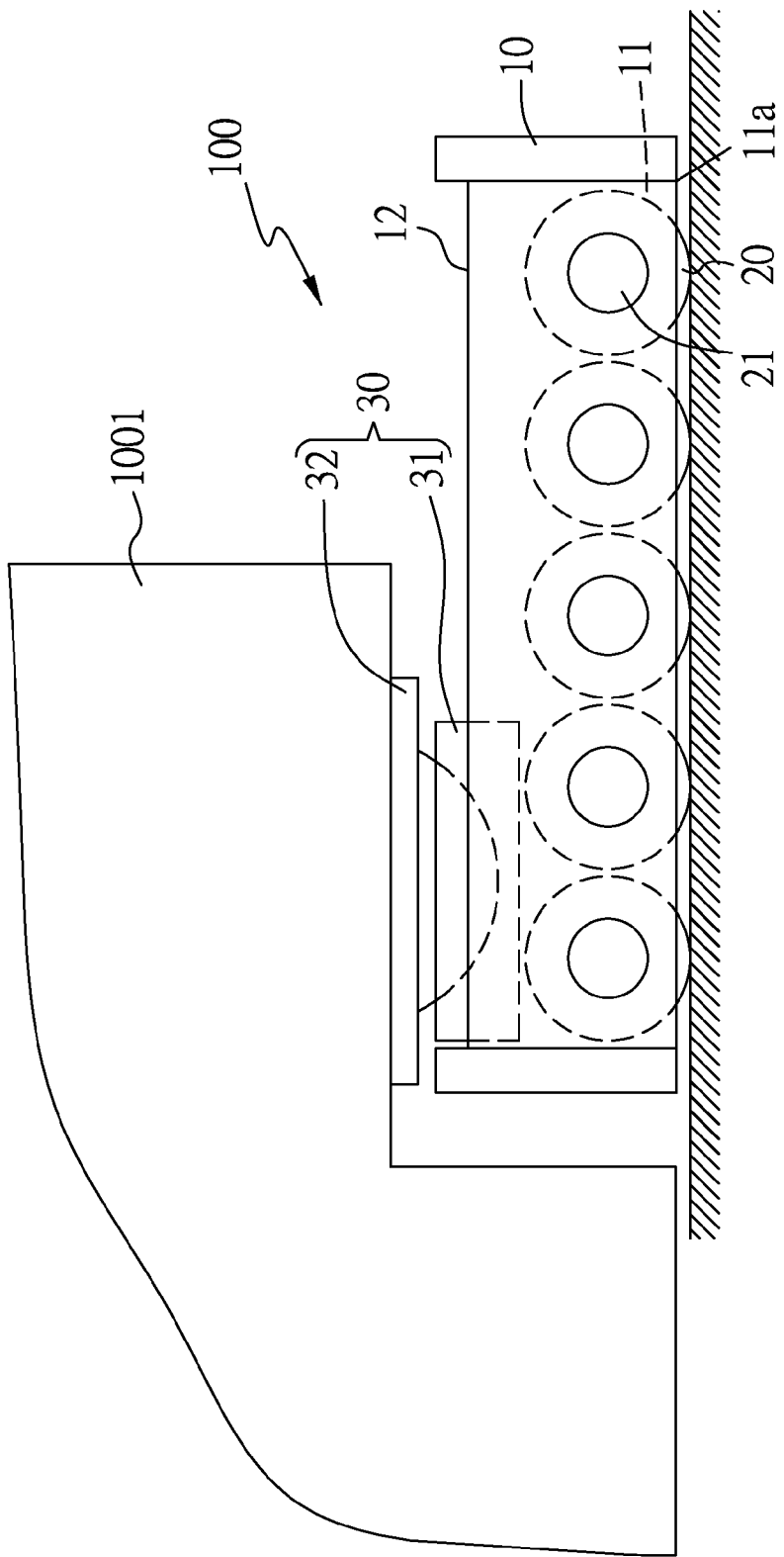
FIGS. 4 to 7 are schematic views showing various different using statuses of a tank wheel in accordance with the first preferred embodiment of the present invention.

With reference to FIG. 4 for a first using status of a tank wheel of the present invention, the bottom edge of an object 1001 is very narrow. When a user needs to transport the object 1001, the user lifts the object 1001 to a specific height by a jack (not shown in the figure), and then places the object 1001 onto the tank wheel 100. Since the bottom edge of the object 1001 is very narrow, the user usually pushes the main body 10, and then slides the object supporting member 30 from the rail 12 of the main body 10 to the bottom edge of the object 1001. By such design, the object support platform 32 completely fits the bottom of the object 1001, and the weight of the object 1001 falls at a position within the tank wheel 100, so that the tank wheel 100 can transport the object 1001 stably.

Figure 5:
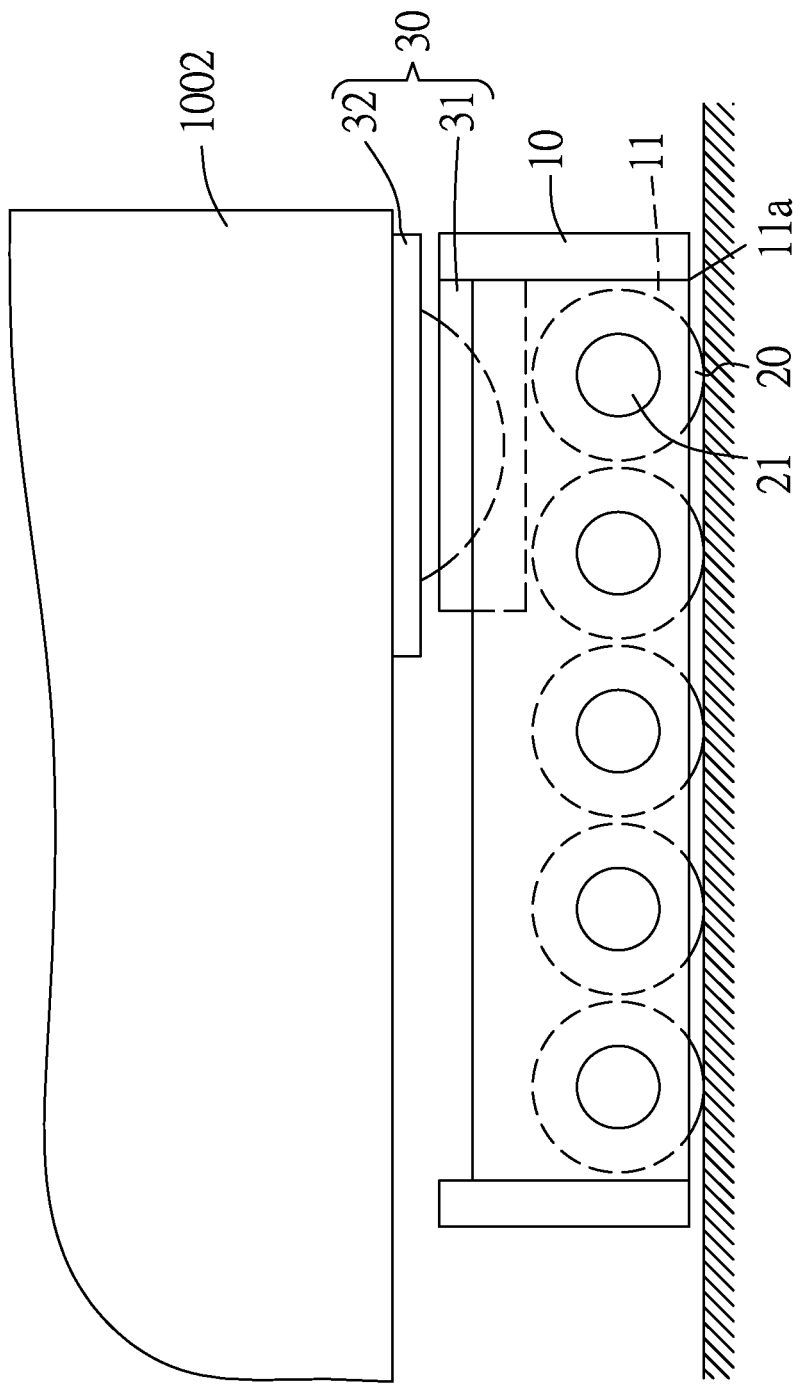

With reference to FIG. 5 for a second using status of the tank wheel of the present invention, the bottom edge of an object 1002 is very wide. When a user needs to transport the object 1002, the user lifts the object 1002 to a specific height by a jack (not shown in the figure) and then puts the object 1002 onto the tank wheel 100. Since the bottom edge of the object 1002 is very wide, the user pushes the main body 10, and then slides the object supporting member 30 from the rail 12 of the main body 10 to an appropriate position of the bottom of the object 1002, so that the center of gravity of the object 1002 falls at a position within the tank wheel 100. By such design, the object support platform 32 completely fits the bottom of the object 1002, and the weight of the object 1002 falls onto a position within the tank wheel 100, so that the tank wheel 100 can transport the object 1002 stably.

Figure 6:
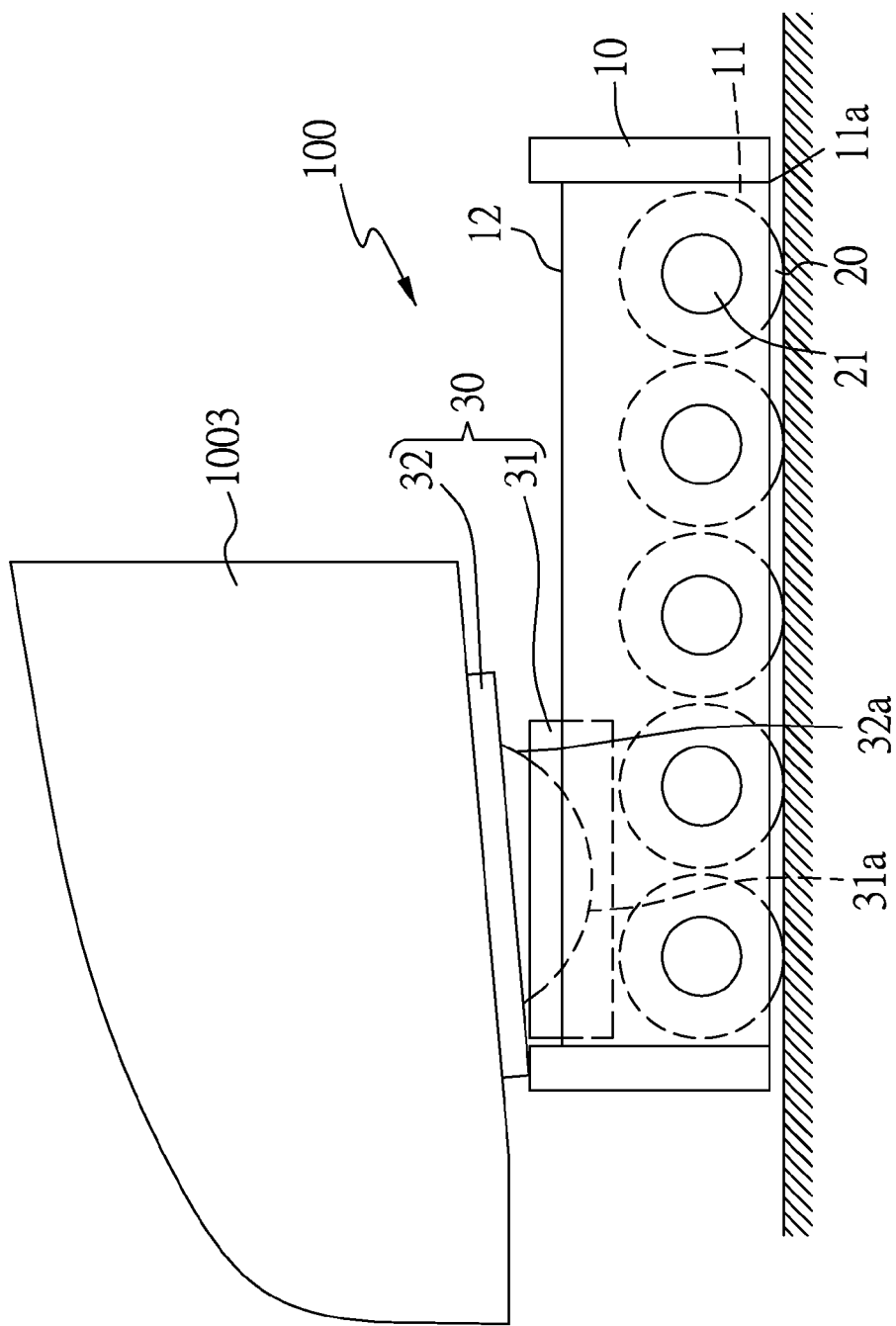

With reference to FIG. 6 for a third using status of the tank wheel of the present invention, the bottom edge of an object 1003 is a bevel. When a user needs to transport the object 1003, the user lifts the object 1003 to a specific height by a jack (not shown in the figure) and then puts the object 1003 onto the tank wheel 100. Since the bottom edge of the object 1003 is a bevel, the user pushes the main body 10, and slides the object supporting member 30 from the rail 12 of the main body 10 to an appropriate position at the bottom of the object 1003, so that the center of gravity of the object 1003 falls at a position within the tank wheel 100. By the design of the assembling part 31a and the hemispherical base 32a, the object support platform 32 is attached completely onto the bevel at the bottom edge of the object 1003 to facilitate the transportation of the object 1003. In summation, the inclination of the object support platform 32 is adjusted to fit the bevel at the bottom edge of the object 1003, so that when the object 1003 is transported, the object 1003 will not shaken easily, so as to facilitate the transportation of the object 1003.

Figure 7:
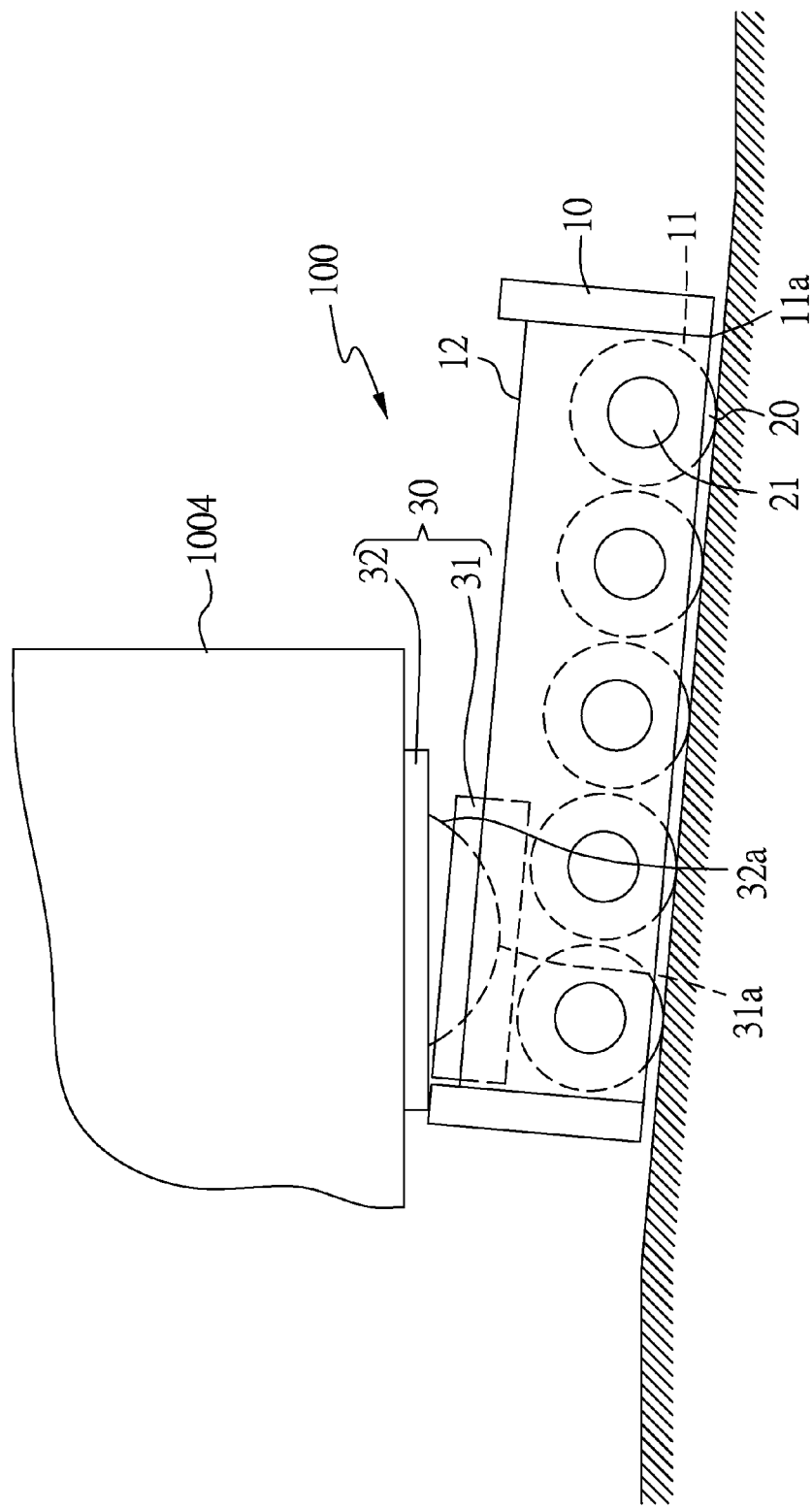

With reference to FIG. 7 for a fourth using status of the tank wheel of the present invention, the path for transporting an object 1004 is a slope. When a user needs to transport the object 1004, the user lifts the object 1004 to a specific height by a jack (not shown in the figure) and then puts the object 1004 onto the tank wheel 100. The user pushes the main body 10 into the bottom of the object 1004 and then slides the object supporting member 30 from the rail 12 of the main body 10 to an appropriate position of the bottom of the object 1004, so that the center of gravity of the object 1004 falls at a position within the tank wheel 100. When the object 1004 is transported through a path including a slope, the design of the assembling part 31a and the hemispherical base 32a allows the main body 10 to climb up the slope while the object support platform 32 is still completely attached onto the bottom of the object 1004. In summation, the operation of the assembling part 31a and the hemispherical base 32a tilts the main body 10 while maintaining the object support platform 32 to be attached onto the bottom of the object 1004, so that when the object 1004 is transported, the object 1004 will not be shaken easily, so as to facilitate the transportation of the object 1004.

The rollers 20 come with a simple structure which is not shown in the figure, so that even thought there are pebbles on the ground, the pebbles will not be stick into the rollers 20 easily, nor snapped into the containing groove 11 easily. For a rough ground, the rollers 20 will not be deformed easily, since the rollers 20 are arranged in parallel to one another.

In summation of the description above, the design of the tank wheel of the present invention allows the tank wheel to be used in various different types of grounds, so that the tank wheel has a durable effect. In addition, the design of the rail, the rail corresponding seat and the hemispherical base allows the tank wheel to be used for the bottom of various different types of objects.

Figure 8:
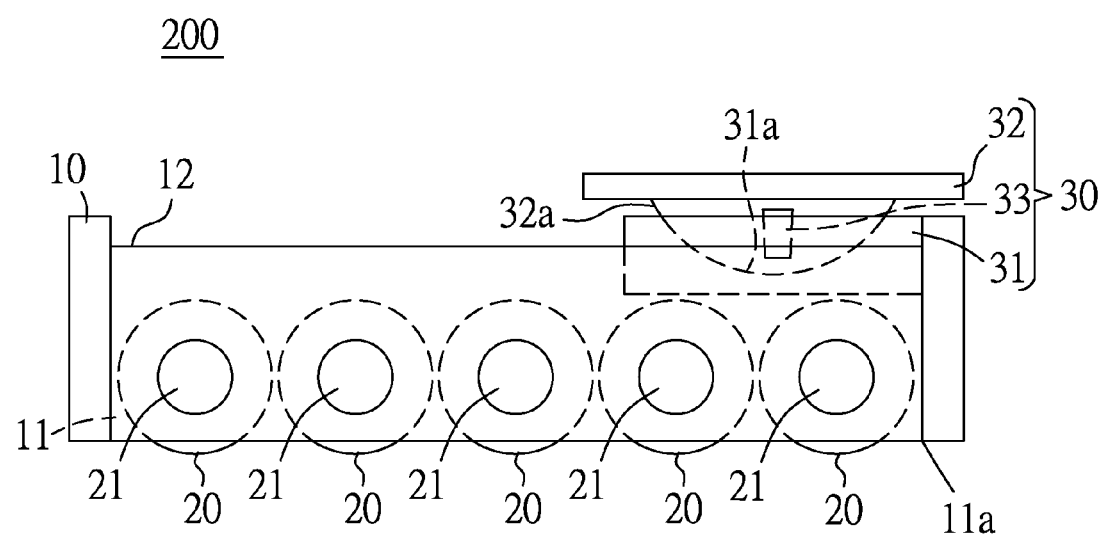
FIG. 8 is a front view of a tank wheel in accordance with a second preferred embodiment of the present invention.

With reference to FIG. 8 for the tank wheel in accordance with the second preferred embodiment of the present invention, the tank wheel 200 has a design substantially the same as the design of the tank wheel 100 of the first preferred embodiment, the object supporting member 30 further includes a movable fixing member 33 installed at the rail corresponding seat 31 for movably fixing the rail corresponding seat 31 to the rail 12 of the main body 10.

Even not shown in the figure, we can derive the following from FIGS. 4 to 7. When the object supporting member 30 is disposed at the bottom of the object 1001, 1002, 1003, 1004, the design of the movable fixing member 33 fixes the rail corresponding seat 31 to prevent the rail corresponding seat 31 from sliding during the transportation process, so as to facilitate users to transport the object 1001, 1002, 1003, 1004.

In summation of the description above, the tank wheel of the present invention can be used on various different types of grounds, so as to provide a durable effect of the tank wheel. In addition, the design of the rail, the rail corresponding seat and the hemispherical base allows the tank wheel to be applied to the bottom of various different types of objects. In addition, the design of fixing member allows the rail corresponding seat and the main body to be fixed with each other when the tank wheel is situated under the object, so as to facilitate the users to transport the object.

While the invention has been described by means of specific embodiments, numerous modifications and variations could be made thereto by those skilled in the art without departing from the scope and spirit of the invention set forth in the claims.

What is claimed is:
1. A tank wheel, comprising:
  a main body, having:
    a containing groove, concavely formed in the main body, and having an opening facing downward; and
    a rail, installed at the top of the main body;
  a plurality of rollers, axially and respectively coupled to a plurality of shafts in the containing groove of the main body, and the rollers being parallel to one another and slightly protruded out from the opening of the containing groove; and
  an object supporting member, having:
    a rail corresponding seat, movably installed on the rail of the main body, and having an assembling part disposed at the top of the rail corresponding seat; and
    an object support platform, having a hemispherical base disposed at the bottom of the object support platform, and the hemispherical base corresponding to the assembling part, and the object support platform being installed at the rail corresponding seat, and the object support platform being tiltable relative to the rail corresponding seat.

2. The tank wheel of claim 1, wherein the rollers are cylindrical rollers.

3. The tank wheel of claim 2, wherein, the object supporting member further comprises a releasable fixing member installed at the rail corresponding seat for releasably fixing the rail corresponding seat to the rail of the main body.

4. The tank wheel of claim 1, wherein, the object supporting member further comprises a releasable fixing member installed at the rail corresponding seat for releasably fixing the rail corresponding seat to the rail of the main body.

* * * * *